United States Patent [19]

Umeda et al.

[11] Patent Number: 4,562,530

[45] Date of Patent: Dec. 31, 1985

[54] ELEVATOR TRAFFIC DEMAND ANALYZING SYSTEM

[75] Inventors: Yasukazu Umeda, Kasugai; Kenichi Uetani, Nishi, both of Japan

[73] Assignee: Mitsubishi Denki Kabushiki Kaisha, Tokyo, Japan

[21] Appl. No.: 481,940

[22] Filed: Apr. 4, 1983

[30] Foreign Application Priority Data

Apr. 6, 1982 [JP] Japan .................................. 57-56867

[51] Int. Cl.[4] .......................... G05B 13/02; B66B 1/00; B66B 3/00

[52] U.S. Cl. .................................. 364/148; 187/29 R; 340/19 R; 340/20

[58] Field of Search ........................... 364/148; 187/29; 340/19 R, 20

[56] References Cited

U.S. PATENT DOCUMENTS 3,593,825 7/1971 Gieseler ............................ 187/29 R
3,967,702 7/1976 Iwaska et al. ...................... 187/29 R
3,999,631 12/1976 Iwasaka et al. .................... 187/29 R
4,030,572 6/1977 Kaneko et al. ..................... 187/29 R
4,047,596 9/1977 Winkler ............................ 187/29 R
4,411,338 10/1983 Kuzunuki et al. ................ 187/29 R
4,458,787 7/1984 Uetani .............................. 187/29 R

OTHER PUBLICATIONS

Hitachi Group Supervisory Control System "CIP-Series" for Elevators; Tatsuo Iwasaka et al., Hitachi Rev. vol. 28 (1979).

*Primary Examiner*—Jerry Smith
*Assistant Examiner*—Charles B. Meyer
*Attorney, Agent, or Firm*—Leydig, Voit & Mayer Ltd.

[57] ABSTRACT

An improved traffic demand analyzing system is disclosed in which the past traffic demand data that have occurred during the same predetermined unit time periods as the current time period are computed so that the past data may be implemented in the group control of the elevator operation. The system comprises a unit for measuring and storing the traffic volume for a plurality of predetermined time periods up to the current time period, and a unit for preestimating the traffic volume for the near future through placing greater emphasis on the traffic volume associated with said predetermined time period nearer to the current time or through making use of only traffic values associated with a certain number predetermined time periods near to the current time.

10 Claims, 4 Drawing Figures

ELEVATOR TRAFFIC DEMAND ANALYZING SYSTEM

BACKGROUND OF THE INVENTION

This invention relates to an improved system or apparatus for the analysis of elevator traffic demand.

For the more efficient operation of a plurality of elevator cars, a tendency exists towards resorting to group control in which a most appropriate elevator car in a plurality of elevator cars is selected as a function of changing traffic demands and in response to the occurrence of a floor call.

However, it may frequently happen that the car most appropriate at the time of a floor call occurrence turns out to be inappropriate due to subsequent changes in traffic demand. Furthermore, in an instantaneous forecast system, i.e. a system in which a car corresponding to a floor call is indicated by an arrival forecast lamp upon activation of a respective floor button, the result of poor selection is immediately apparent since the allocated car, once decided, cannot be easily changed.

On the other hand, transition of traffic demand in a building over e.g. a one-day cycle occurs in a substantially fixed pattern. In this regard, it has been proposed to utilize the information of the traffic demand during predetermined unit time intervals observed in the past, which were recorded and processed statistically, and to perform group control based on the traffic demand thus estimated for future times. In this manner, the efficiency of the group control operation may be improved drastically. In this case, however, problems arose of determining the manner in which to process the past traffic volume data of the same predetermined unit time intervals statistically, and the manner in which to preestimate future traffic demands.

The simplest method of processing the past traffic demand for the same time intervals statistically and to preestimate future traffic demands is to sum up certain traffic volume information; for example, the number of times floor calls occurred during predetermined unit time periods each day, wherein each of said predetermined time periods is divided by the number of calls during that time interval to derived a mean value which is used to postulate that the same number of floor calls respective to each of the mean values will occur in the course of the respective predetermined time period of the next day.

However, with this system, in case of seasonal or other changes in the traffic demand in the building, the traffic demand that prevailed before the changes have occurred is necessarily taken into account in computing the mean value and hence the resulting mean value does not reflect the actual traffic demand. On the other hand, it is not proper to postulate that the traffic demand during predetermined time periods of the preceding day are equal to the traffic demand during the same predetermined time periods of the current day. This is because the data of the preceding day may have been much different than usual due to some peculiar traffic states.

SUMMARY OF THE INVENTION

It is therefore an object of the present invention to obviate the above mentioned drawbacks of the prior-art systems and to provide a system or apparatus for analyzing elevator traffic demands which incorporates a chronologically hierarchical system, wherein more weight is given to traffic volume values recently encountered than to traffic volumes which are not as recent, and so on, or wherein only recent data is considered in computing the preestimated traffic volume for the near future.

Accordingly, more appropriate preestimation of future traffic demands can be made.

DESCRIPTION OF PREFERRED EMBODIMENTS

Figure 1:
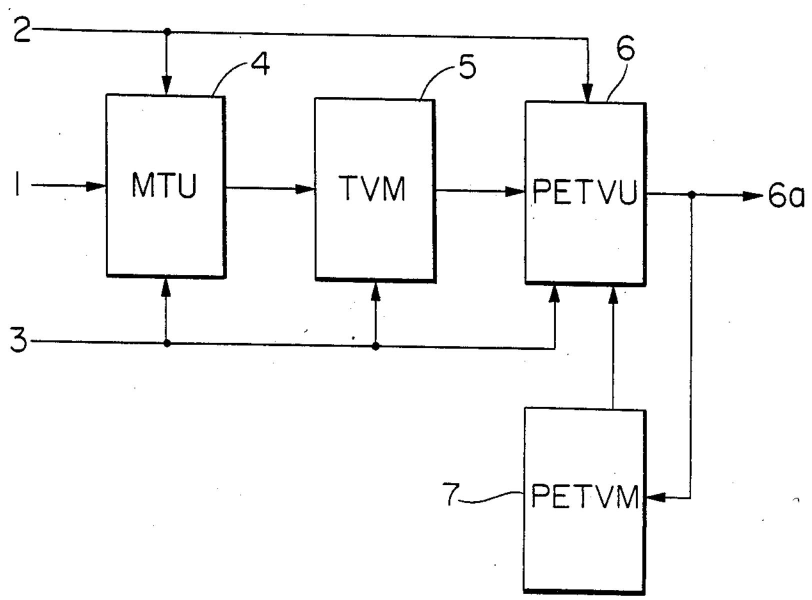
FIG. 1 is a block diagram showing an embodiment of an analysis system according to the present invention.
Figure 2:
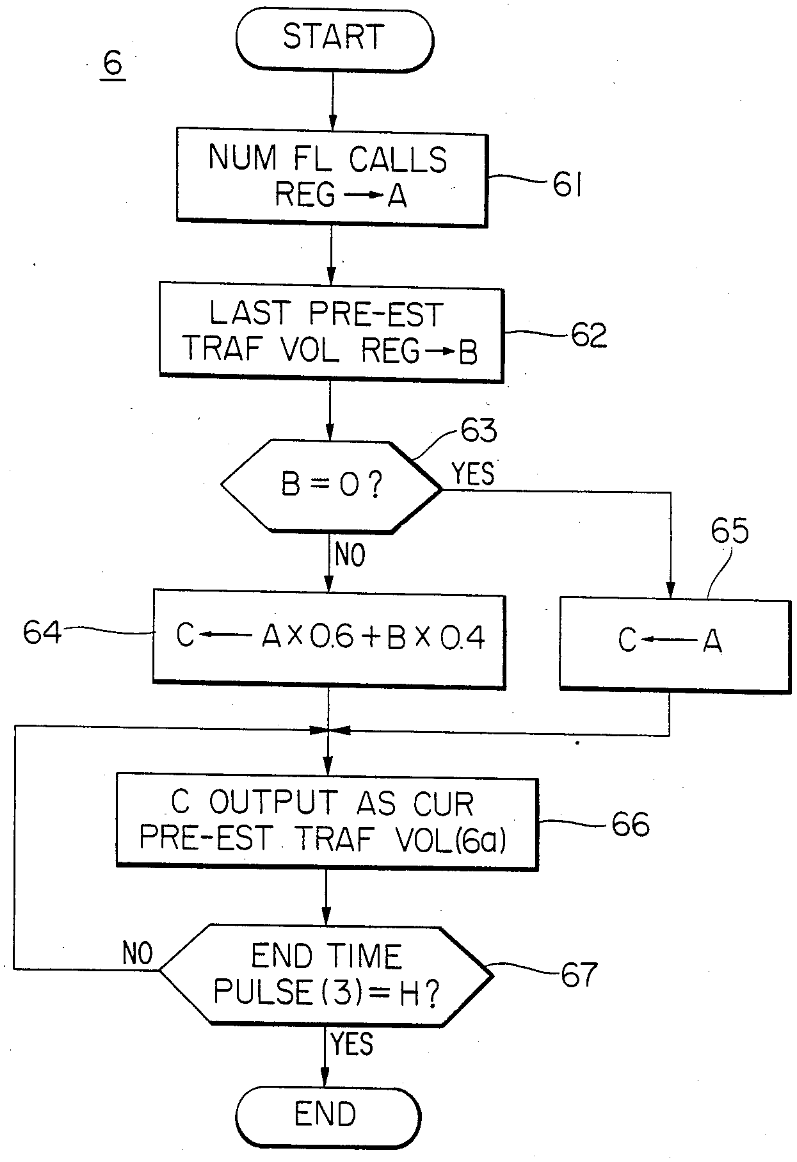
FIG. 2 is a flowchart showing the operational procedure of the traffic volume preestimating unit shown in FIG. 1.

FIGS. 1 and 2 illustrate a first embodiment of an analysis system of the present invention. Although a one-day cycle is used in the present embodiment, it is not intended to limit the present invention and any number of days may be used.

In the drawings, numeral 1 designates a floor call pulse input which goes high when a floor call is registered, numeral 2 designates a start time pulse input which goes high when it is time to start measuring the number of times floor calls occur, and numeral 3 designates an end time pulse which goes high when it is time to terminate the measurement of floor calls for that given time interval. Numeral 4 designates a unit for measuring traffic volume (MTU) such as a digital counter or shift counter, which counts the number of floor calls appearing as pulse signals on the floor call pulse input 1 from the time the start time pulse input 2 goes high until the end time pulse input 3 goes high, and the contents of which are reset shortly after the end time pulse input 3 goes high. Numeral 5 designates a traffic volume memory (TVM) which stores data present in traffic volume measuring unit 4 at the time the end time pulse input 3 goes high. Numeral 6 designates a unit for preestimating the traffic volume (PETVU) and basically comprises a microcomputer which performs operations as shown in FIG. 2 when the start time pulse input 2 goes high and which outputs a preestimated traffic volume signal 6*a* corresponding to the number of times floor calls are registered in the measuring unit 4 until the end time pulse input 3 goes high. Numeral 7 designates a memory (PETVM) for the storage of the preestimated traffic volume signals 6*a*. Referring to FIG. 2, blocks 61 through 67 designate the operational procedure of the preestimating unit 6.

Herebelow, the operation of the present embodiment is explained by referring to the case of computing or processing the number of times floor calls occur during one of the plurality of periods of a one-day traffic volume cycle, namely, a period from eight until a quarter past eight in the morning. However, the following description may apply to any period other than the abovementioned period.

The start time pulse input 2 goes high at eight in the morning of a first day and the measuring unit 4 starts to count the floor call pulses appearing on the floor call pulse input 1. The count is incremented each time a floor call is made. The counting operation is terminated at a quarter past eight when the end time pulse input 3 goes high. Simultaneously, the traffic volume memory unit 5 stores the final count value in the measuring unit 4 at the time the end time pulse input 3 goes high and the measuring unit 4 is reset to zero. It is now assumed that a count of 120 has been registered in the memory unit 5 at the end of the 8 to 8:15 period of the first day.

On the other hand, the traffic volume preestimating unit 6 starts the operation shown in FIG. 2 at eight o'clock on the first day when the start time pulse input 2 goes high. Thus, as indicated in block 61, the data in the traffic volume memory unit 5 is entered as A. In block 62, the data in the preestimated traffic volume memory unit 7 is entered as B. It is assumed that the memory units 5 and 7 have both been initially set to zero at the time of start of the study operation, i. e., A=B=0. Thus, control proceeds from block 63 to block 65, and the data C is reset to be equal to A. In block 66, the data C is output as the preestimated traffic volume signal 6*a* at this time. In this case, C=0. In block 67, it is determined whether the end time pulse input 3 is high or not. If the pulse input 3 is not high, control is returned to the block 66 and the next data C is output. The above sequence of operations is terminated when the end time pulse input 3 goes high and the preestimated traffic volume data C is stored in the memory unit 7.

The operation of the traffic volume preestimating unit 6 is again started at eight o'clock in the morning of the second day. The data in the preestimated traffic volume memory unit 7 is still zero, while the data in the traffic volume memory unit 5 is reset from 0 to 120, i. e., A=120 and B=0 in the blocks 61, 62, respectively. Accordingly, control proceeds from block 63 to block 65 where C is set to 120. Thus, in the next block 66, the data C equals 120 and is output as a preestimated traffic volume signal 6*a*. The above illustrates the operation of the traffic volume measuring unit 4 and the traffic volume memory unit 5 during the 8:00–8:15 period of the second day. It is now assumed that the number of floor calls that have occurred during this period of the second day is equal to 150.

In the operation of the traffic volume preestimating unit 6 for the third day, A=150 in the block 61 and B=120 in the block 62 and thus the control proceeds through blocks 63 and 64 where the operation $C-A\times0.6+B\times0.4$ occurs. Accordingly, the calculation $C=150\times0.6+120\times0.4$ is made and the new value of C is set at 138 and is output as the preestimated traffic volume signal 6*a* for the eight o'clock to the quarter past eight period of the third day. It is now assumed that the number of floor calls for this period of the third day is 155.

It is also assumed that the numbers of floor calls for the 8:00–8:15 periods of the fourth through tenth days are 164, 160, 172, 165, 180, 177 and 179, respectively. The numbers of times of floor call occurrences and the preestimated traffic volume signals 6*a* may be tabulated as in the following Table.

| Day | Number of Times of Floor Call Occurrences | Preestimated Traffic Volume |
|---|---|---|
| 1st (given day) | 120 | 0 |
| 2nd | 150 | 120 |

-continued

| Day | Number of Times of Floor Call Occurrences | Preestimated Traffic Volume |
|---|---|---|
| 3rd | 155 | 138 |
| 4th | 164 | 148 |
| 5th | 160 | 158 |
| 6th | 172 | 159 |
| 7th | 165 | 167 |
| 8th | 180 | 166 |
| 9th | 177 | 174 |
| 10th | 179 | 176 |
| 11th | — | 178 |

It should be noted that the calculated preestimated traffic volumes have been rounded to the nearest integers in the above Table.

From the foregoing it is apparent that 178 floor calls for preestimated to occur for the eight o'clock until a quarter past eight period for the 11th day, and group control may be appropriately preprogrammed by taking such information of traffic into account.

It is apparent that, when there is a tendency for the number of floor call occurrences to increase gradually, for example, the number of floor call occurrences for the 10th day, it may be reasonably expected that a higher mean value will also be obtained, namely a mean value of 176 for the 10th day as compared with 174 for the 9th day.

In the present embodiment, the traffic volume for a given one-quarter hour period for a preceding day and the preestimated traffic volume obtained during said period for the preceding day are used as traffic volume data for preestimating the traffic volume for the same one-quarter hour period for the present day. Since only two traffic volume values need be stored in this manner, the required memory area may be reduced.

However, the traffic volume values for a plurality of past days such as ten days may be stored and the mean value of these ten values may be computed accordingly. This would require a memory space that can store ten sets of data.

According to the present invention, since the preestimated traffic volume for the preceding day is treated in a similar manner as the aforementioned mean value of the past data for traffic volume, only one memory area is required for storage of the preestimated data and the program required for computing the mean values may also be abbreviated.

Figure 3:
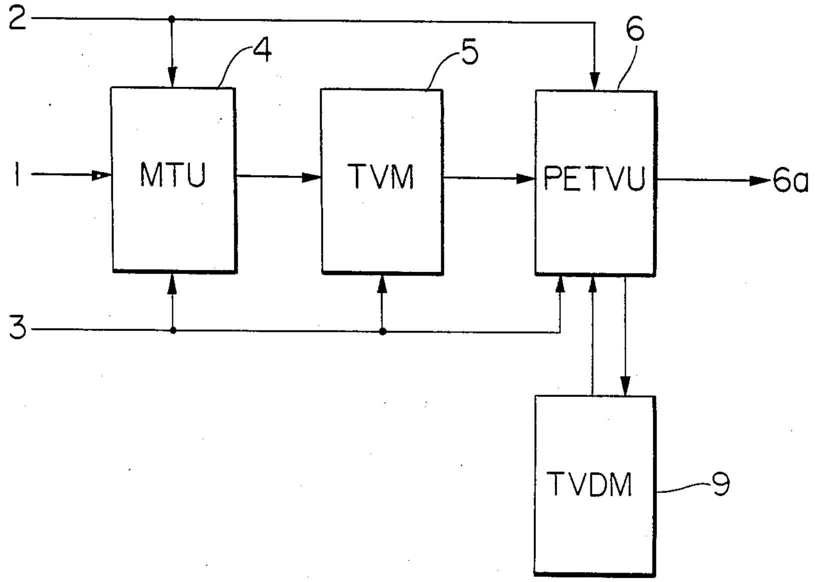
FIG. 3 is a block diagram showing another embodiment of the analysis system according to the present invention.
Figure 4:
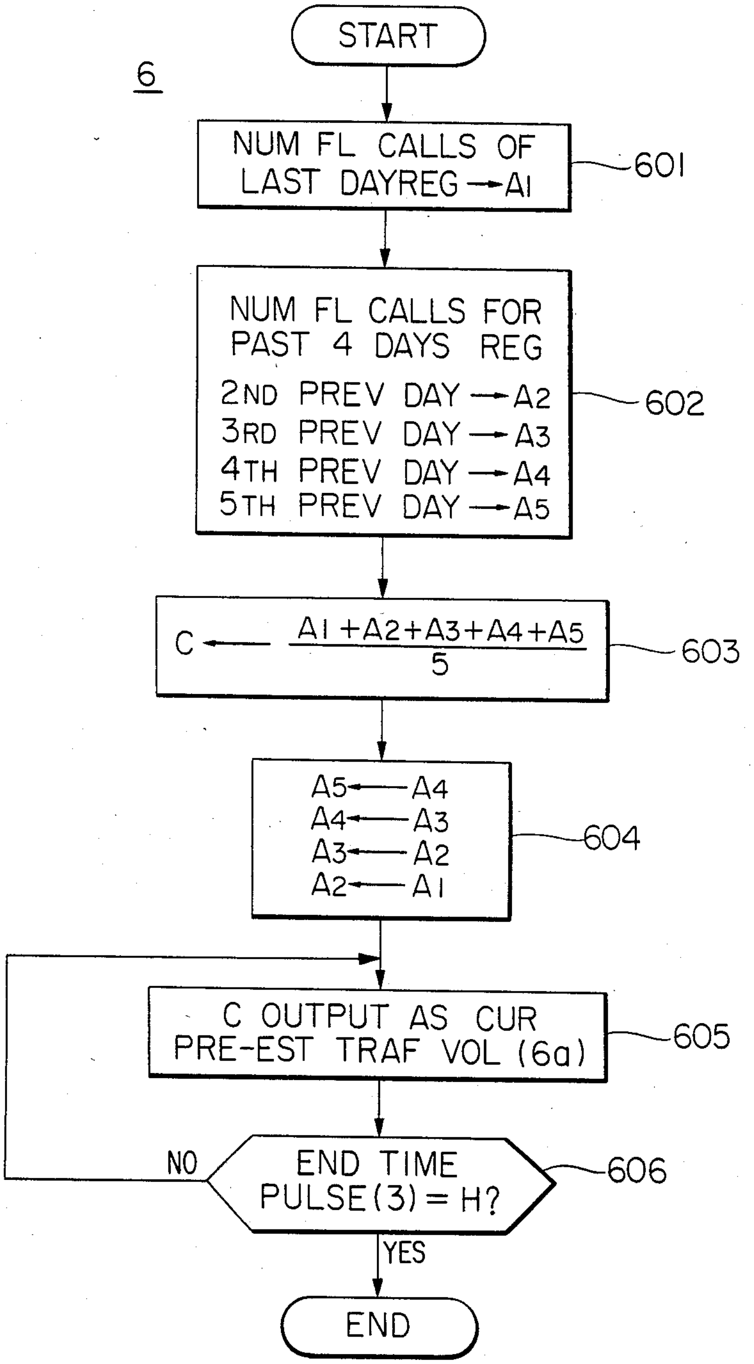
FIG. 4 is a flowchart showing the operational procedure of the traffic volume preestimating unit shown in FIG. 3.

FIGS. 3 and 4 illustrate a modified embodiment of the present invention.

Referring to FIG. 3, numeral 6 designates a traffic volume preestimating unit (PETVU) which performs an operation in accordance with steps 601 through 606 shown in FIG. 4. Numeral 9 denotes a traffic volume data memory (TVDM) which stores the number of floor call occurrences for the past four days. The remaining portions are the same as those shown in FIG. 1.

In the preestimation unit 6, the number of floor calls for a preceding day is input in step 601 as data A1. Then, the numbers of floor calls for the preceding four days are input in step 602 as data A2 for the second preceding day, data A3 for the third preceding day, data A4 for the fourth preceding day and data A5 for the fifth preceding day. Then, the mean value of the numbers of floor calls for the past five days is computed in step 603 as data C ($C=(A1+A2+A3+A4+A5)-5$). Then, in step 604, the data representative of the number of floor calls are each respectively moved up to become the next day's number of floor calls in readiness for the operation on the following day. The procedures 605, 606 are the same as the procedures 66, 67 shown in FIG. 2.

Using the number of floor call occurrences as those shown in the preceding table, the number of floor call occurrences and the preestimated traffic volume signal 6*a* for the present embodiment are as tabulated in the Table below.

| Day | Number of Times of Floor Calls | Preestimated Traffic Data (6a) |
|---|---|---|
| 1st | 120 | 0 |
| 2nd | 150 | 24 |
| 3rd | 155 | 54 |
| 4th | 164 | 85 |
| 5th | 160 | 118 |
| 6th | 172 | 150 |
| 7th | 165 | 160 |
| 8th | 180 | 163 |
| 9th | 177 | 168 |
| 10th | 179 | 171 |
| 11th | — | 175 |

In the present embodiment, the preestimated traffic volume signals 6*a* are smaller for the first to fifth days because less than five sets of data where utilized in computing the mean value. The preestimation will become regular from the sixth day on and a preestimated value of 175 for the 11th day is more appropriate than the mean value of all of the past data as described above.

In the above Table, the number of floor calls for the days preceding the first day are assumed to be zero. Alternatively it is possible to substitute these values with any arbitrarily selected numbers representative of the expected number of floor calls which are expected to occur when considering the state of use of the building. In this case, a more exact preestimated traffic signal 6*a* may be determined more quickly from the outset as a basis for group control operation.

In the above embodiments, the data representative of the numbers of times of floor calls is used for studying and estimating future traffic demand. However, this is not to be limited to this particular application. For instance, the data may be representative of the number of passengers getting into the elevator car or going out of the car, the total number of passengers, the number of car calls, data indicative of various traffic demand states such as the number of times the car is jammed with passengers, data indicative of service states such as waiting time duration, data concerning power consumption and the like.

The preestimated traffic volume data 6*a* may be used for call allocation setting of a waiting floor for the car, estimation of arrival time, setting of the load center for divisional driving (i.e. the floor to be the boundary of the divisional driving), the numbers of allocated cars, the door opening and closing time, the number of cars in operation, automatic call registration or the like.

In the foregoing, it can be seen that the control example making use of preestimated traffic signals 6*a* is not intended to be specifically applied to floor calls.

The present invention is also not intended to be limited to the 8 o'clock to a quarter past 8 period.

The numbers of floor calls may be computed according to the respective floors or the car operating directions.

In the embodiment of FIG. 1, the data for the preceding day and the data for the second preceding day, etc., are sequentially taken into account with the weight factors of 0.6 and 0.4, respectively, in order to give priority to the data representing the day nearest to the current day. However, this again is not intended to limit of the present invention thereto. For example, separate weight factors may be allocated to the respective days being considered, such as $\frac{1}{2}$ for the preceding day, $\frac{1}{2}^2$ for the second preceding day, $\frac{1}{2}^3$ for the third preceding day, $\frac{1}{2}^4$ for the fourth preceding day, and so forth.

It is seen from the foregoing that the traffic demand analysis system of the present invention provides for estimation of the traffic demand for the near-future by allocating larger weight factors to predetermined past periods nearer to the current time, or by using only the traffic volume values nearer to the current time in deriving preestimated traffic volume signals, thereby enabling more efficient control of the elevator operation.

What is claimed is:

1. A system for controlling a plurality of elevator cars according to a varying traffic demand wherein the traffic demand is divided into a plurality of time cycles which, in turn, are further divided into a plurality of corresponding time periods, said system comprising:

means for generating in each cycle a value indicative of the measured traffic demand in at least one period in the cycle, the periods for which the measured values are generated corresponding from one cycle to another;

first storage means for storing in each cycle the measured values for a predetermined number of preceding corresponding periods;

means for generating in each cycle a value indicative of an estimated traffic demand for a corresponding period subsequent to the preceding corresponding period in accordance with the measured values in said first storage means; and means for selectively controlling at least one elevator car in accordance with the estimated value.

2. The system as claimed in claim 1 further comprising a second storage means for storing in each cycle the estimated value generated by the estimated value generating means, said estimated value generating means generating an estimated value further in accordance with a previous estimated value stored in said second storage means.

3. The system as claimed in claim 2 wherein the estimated value generating means includes means for weighting the values stored in the first and second storage means, the values for the most recently previous corresponding periods being given the most weight.

4. The system as claimed in claim 3 wherein the weighting means includes means for selectively associating a coefficient with each value stored in the first and second storage means, the values for the most recently previous corresponding periods being associated with the most weighty coefficients, and wherein the estimated value generating means includes means for multiplying each value by the associated coefficient to generate an estimated value.

5. The system as claimed in claim 4 wherein the associating means associates a first fixed coefficient with the measured value for the preceding corresponding period and a second fixed coefficient with the estimated value for the preceding corresponding period, said first coefficient being greater than said second coefficient whereby greater emphasis is placed on the measured value for said period than on the estimated value for said period.

6. The system as claimed in claim 2 wherein the measured value generating means and the estimated value generating means start generating values at the beginning of each of said corresponding periods, said estimated value generating means including means for computing an estimated value in accordance with the values in the first and second storage means.

7. The system as claimed in claim 6 wherein the measured value generating means and the estimated value generating means stop generating values at the end of each of said corresponding periods and wherein the first storage means receives and stores at the end of said corresponding period the measured value generated by the measured value generating means.

8. The system as claimed in claim 7 wherein the first storage means has stored therein only the measured value for the preceding corresponding period and wherein the second storage means has stored therein only the estimated value generated during said preceding corresponding period.

9. The system as claimed in claim 1 wherein said first storage means includes a first memory means for storing the measured value for the preceding corresponding period and a second memory means for storing the measured values for a second predetermined number of corresponding periods most recently previous to the preceding corresponding period and wherein the estimated value generating means generates an estimated value in accordance with the mean values of the values stored in the first and second memory means.

10. A system for controlling a plurality of elevator cars according to a varying traffic demand wherein the traffic demand is divided into a plurality of time cycles which, in turn, are further divided into a plurality of corresponding time periods, said system comprising:

means for generating in each cycle a value indicative of the measured traffic demand in at least one period in the cycle, the periods for which the measured values are generated corresponding from one cycle to another;

first storage means for storing in each cycle the measured values for a predetermined number of the previous corresponding periods;

means for generating in each cycle a value indicative of an estimated traffic demand for a corresponding period subsequent to the preceding corresponding period in accordance with the measured values in said first storage means, said estimated value generating means including means for weighting the value stored in the first storage means wherein the values for the more recently previous corresponding periods are given more weight; and means for selectively controlling at least one elevator car in accordance with the estimated value.

* * * * *